United States Patent
Hiraguchi

(10) Patent No.: US 7,168,649 B2
(45) Date of Patent: Jan. 30, 2007

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/389,905

(22) Filed: Mar. 18, 2003

(65) Prior Publication Data

US 2003/0173441 A1 Sep. 18, 2003

(30) Foreign Application Priority Data

Mar. 18, 2002 (JP) ............................. 2002-074922

(51) Int. Cl.
*G11B 23/087* (2006.01)

(52) U.S. Cl. ........................................ 242/340; 360/85

(58) Field of Classification Search ................. 242/348, 242/348.2, 332.4, 532.1, 338, 338.1, 340, 242/342, 611, 611.1; 360/85, 95, 132
See application file for complete search history.

(56) References Cited

U.S. PATENT DOCUMENTS

| | | | | |
|---|---|---|---|---|
| 4,774,603 | A | * | 9/1988 | Dong et al. |
| 5,029,771 | A | * | 7/1991 | Ranoia ........................ 242/348 |
| 5,366,173 | A | * | 11/1994 | Lammers et al. ......... 242/338.1 |
| 5,813,622 | A | * | 9/1998 | von Alten .................... 242/348 |
| 6,273,352 | B1 | * | 8/2001 | Johnson et al. .............. 242/340 |
| 6,279,845 | B1 | * | 8/2001 | Hemzacek et al. ......... 242/340 |
| 6,452,747 | B1 | | 9/2002 | Johnson et al. |
| 6,474,582 | B2 | * | 11/2002 | Zwettler et al. ......... 242/348.2 |
| 6,491,247 | B2 | * | 12/2002 | Huettenegger .............. 242/342 |

* cited by examiner

*Primary Examiner*—William A. Rivera
(74) *Attorney, Agent, or Firm*—Sughrue Mion, PLLC

(57) ABSTRACT

A tape cartridge with a reel incorporated therein in which drawing-out and rewinding of the tape and proper positioning of the reel along a height thereof can be carried out reliably. The cartridge is insertable at a tape drive, which has a rotating member that is integrally connectable to the reel when the cartridge is inserted. The rotating member includes a drive gear for transmitting a drive force to the reel and a positioning portion for relatively positioning the reel. The cartridge includes a reel gear that can engage the drive gear for transmitting the drive force and a reel reference portion which is disposed inside the reel gear and is abutable against the positioning portion for the relative positioning.

24 Claims, 4 Drawing Sheets

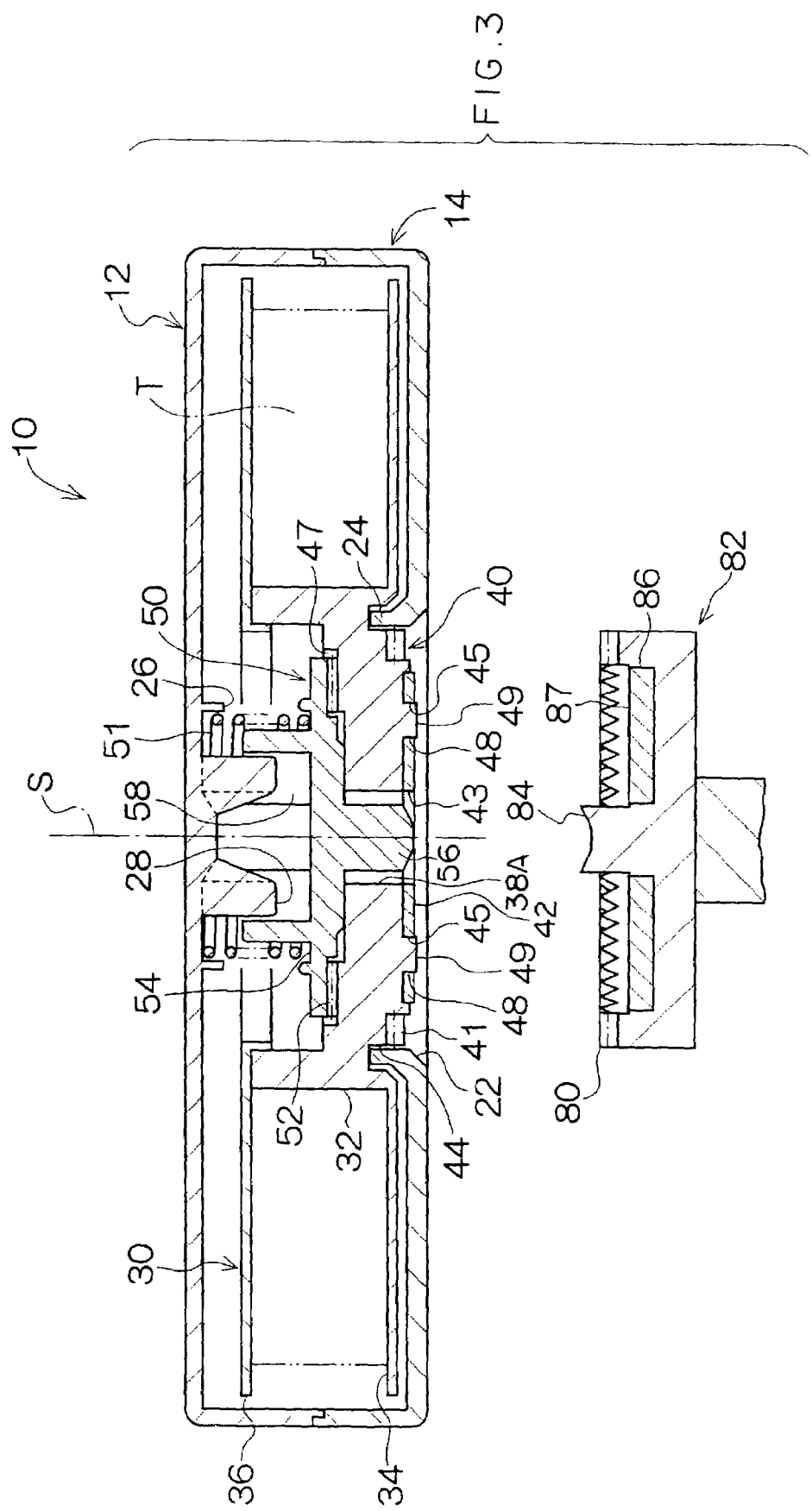

RECORDING TAPE CARTRIDGE

BACKGROUND OF THE INVENTION

1. Field of the Invention

The present invention relates to a recording tape cartridge which rotatably accommodates a single reel onto which a recording tape, such as a magnetic tape or the like, which is used as a recording/play back medium of a computer or the like, is wound.

2. Description of the Related Art

Conventionally, magnetic tape cartridges have been known in which a magnetic tape, which is used as a data recording/playback medium of a computer or the like, is wound on a single reel and the reel is accommodated within a case. A leader member, such as a leader block or a leader pin, for example, is provided at a distal end of the magnetic tape. A drawing-out means, which is provided at a drive device, pulls out the leader member from the magnetic tape cartridge, so that the magnetic tap fixed to the leader member is wound onto a take-up reel of the drive device.

Writing and reading of information on the magnetic tape can be carried out by synchronously rotating the magnetic tape cartridge and the take-up reel of the drive device. The reel of the magnetic tape cartridge is structured such that a cylindrical hub and a bottom flange portion radially projecting from a periphery of a bottom end of the hub are integrally formed, and a top flange portion having the same shape as the bottom flange portion is joined to a top end of the hub. Then, the magnetic tape is wound around a peripheral surface of the hub.

As shown in FIG. 4, a reel gear 108 is carved in an annular shape at a center of a bottom surface of a reel 104 (or a bottom flange portion 106), and the reel 104 is exposed from an opening 102 formed in a bottom surface of a case 100. Due to a drive gear 110, which is provided on a rotating shaft of a drive device, meshing with the reel gear 108, the reel 104 is driven to rotate. In other words, through the substantially serrated reel gear 108 and the substantially serrated drive gear 110 which mesh with one another, a driving force for rotation is transmitted from the drive device to the reel 104 such that the reel 104 is driven to rotate.

However, when the drive gear 110 is rotated relative to the drive gear 110, for example, in the direction indicated by arrow R in FIG. 4B, the drive gear 110 is likely to move the reel gear 108 upward, thereby causing small misalignments or clearances S to be formed between the meshing portions of the drive gear and the reel gear. Due to such misalignments or clearances S, so-called "surge" is generated in which the bottom flange portion 106 wobbles up and down. Therefore, there is a risk that this surge may have an undesirable effects on the feeding and rewinding of the magnetic tape T. Additionally, the meshing portions define a heightwise direction central position thereof, that is indicated by an imaginary line K in FIG. 4B, when seen from the side, as a reference portion (reference surface) in the heightwise direction of the reel 104 with respect to the drive device. Thus, if surge due to the misalignments or clearances S occurs in the meshing portions of the above two members, it may become difficult to obtain accurate positioning due to the fluctuation of the reference portion position.

SUMMARY OF THE INVENTION

It is an object of the present invention to provide a recording tape cartridge that can eliminate the aforementioned problems of the prior art.

In order to achieve the object described above, according to a first aspect of the present invention, there is provided a tape cartridge with a reel incorporated therein, said tape cartridge being insertable at a tape drive, said tape drive carrying out at least one of reading and writing of data and has a rotating member that is integrally connectable to the reel when the tape cartridge is inserted, the rotating member including a drive gear for transmitting a drive force to the reel and a positioning portion for relatively positioning the reel, said tape cartridge comprising: a reel gear, which is substantially ring-shaped and is meshable with the drive gear for transmitting the drive force; and a reel reference portion, which is disposed inside the reel gear and is abutable against the positioning portion for the relative positioning.

According to a second aspect of the present invention, there is provided a tape drive into which a tape cartridge with a reel incorporated therein is insertable and which carries out at least one of reading and writing of data, said tape cartridge comprising a reel gear, which is substantially ring-shaped and is meshable with the drive gear for transmitting the drive force, and a reel reference portion, which is disposed inside the reel gear and is abutable against the positioning portion for the relative positioning, the tape drive comprising: a rotating member that is integrally connectable to the reel when the tape cartridge is inserted; a drive gear that is provided on the rotating member, for transmitting a drive force to the reel; and a positioning portion that is provided in the rotating member, for relatively positioning the reel of the tape cartridge.

BRIEF DESCRIPTION OF THE DRAWINGS

FIG. 3 is a schematic sectional side view showing the magnetic tape cartridge and a drive gear of a drive device, according to the present invention.

DESCRIPTION OF THE PREFERRED EMBODIMENTS

An embodiment of the present invention will be described in detail below on the basis of the drawings. For the sake of convenience of explanation, a direction of loading a recording tape cartridge into a drive device (the direction of arrow P in FIG. 1) is referred to as a front direction, and other directions of back, left, right, top, and bottom will be specified on the basis of the front direction. Further, a magnetic tape is used as a recording tape, and hereinafter, explanation will be given with respect to a magnetic tape cartridge.

Figure 1:
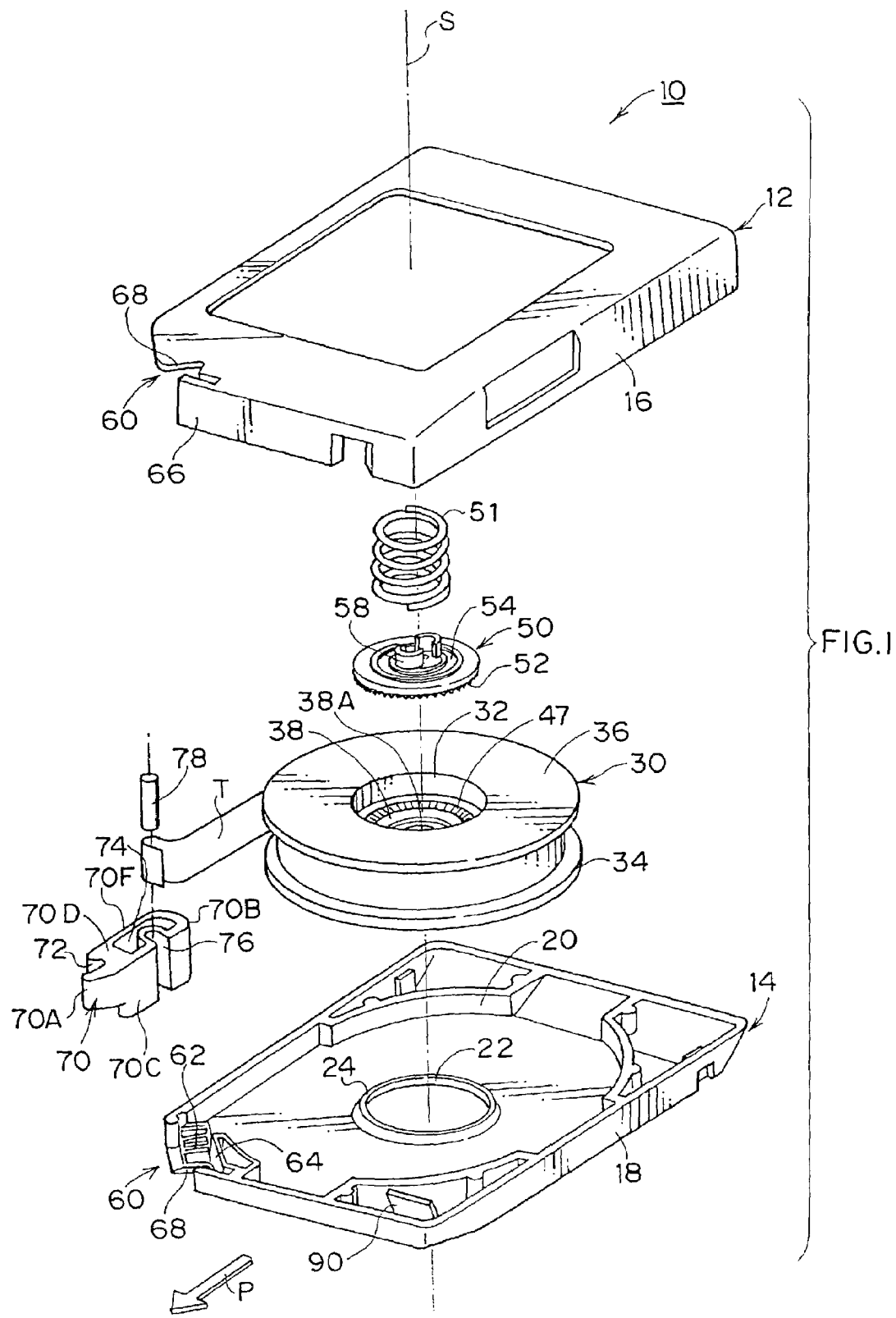
FIG. 1 is an exploded schematic perspective view showing a magnetic tape cartridge according to the present invention, as seen obliquely from above.

As shown in FIG. 1, a magnetic tape cartridge 10 is formed in the shape of a substantially rectangular box by an upper case 12 and a lower case 14, each of which is formed from a synthetic resin and which are joined together by ultrasonic welding at peripheral walls 16 and 18 thereof. Within the magnetic tape cartridge, a single reel 30 is rotatably accommodated on which a magnetic tape T is wound, the magnetic tape T serving as an information recording/playback medium. Specifically, free play-restricting walls 20, each being semi-cylindrical, are provided protruding at interior surfaces of the upper case 12 and the lower case 14. The reel 30 is accommodated inside the free play-restricting walls 20.

A circular aperture 22 is formed at a center of the lower case 14. A reel gear 40 and a protrusion 56, each being formed on a bottom surface side of the reel 30, are exposed from the circular aperture 22 (see FIGS. 2 and 3). The reel 30 is structured such that a cylindrical reel hub 32 and a bottom flange portion 34 radially projecting from a periphery of a bottom end of the reel hub 32 are integrally formed from a synthetic resin, and a top flange portion 36 having the same shape as the bottom flange portion 34 is joined by ultrasonic welding or the like to a top end of the reel hub 32. Then, the magnetic tape T is wound around a peripheral surface of the reel hub 32.

Figure 2:
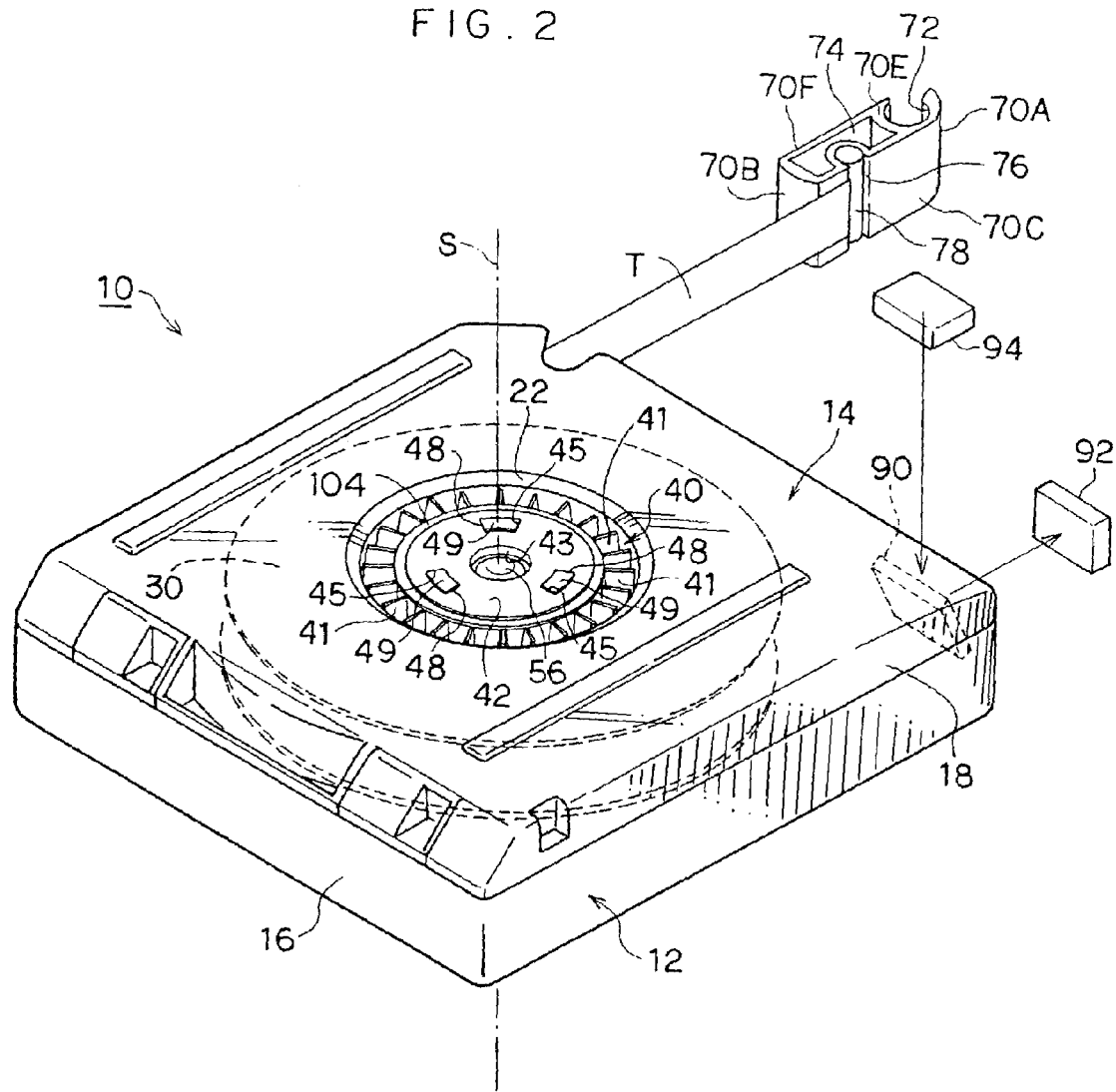
FIG. 2 is a schematic perspective view showing the magnetic tape cartridge according to the present invention, as seen obliquely from below.
Figure 4A:
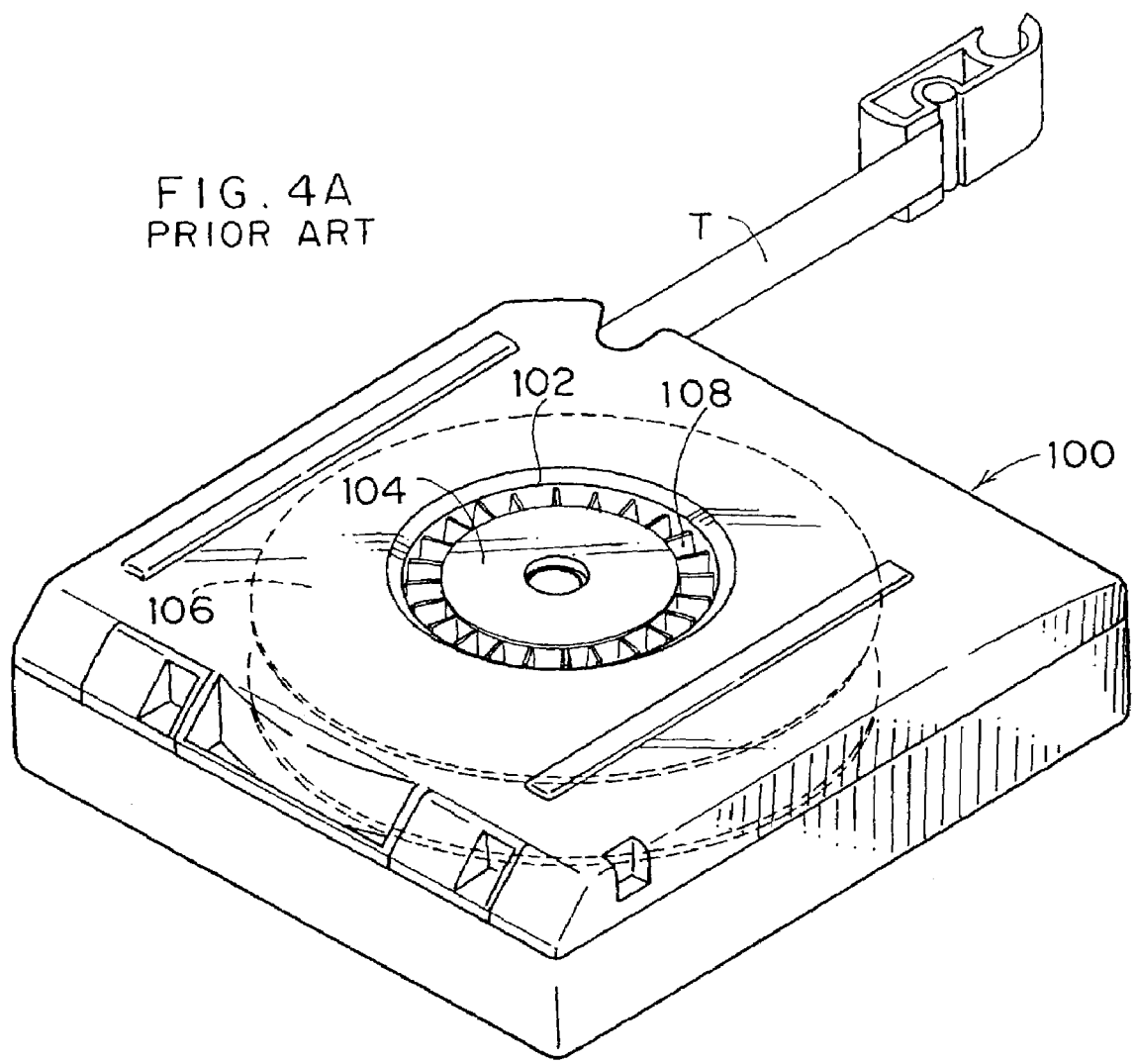
FIG. 4A is a schematic perspective view showing a conventional magnetic tape cartridge.
Figure 4B:
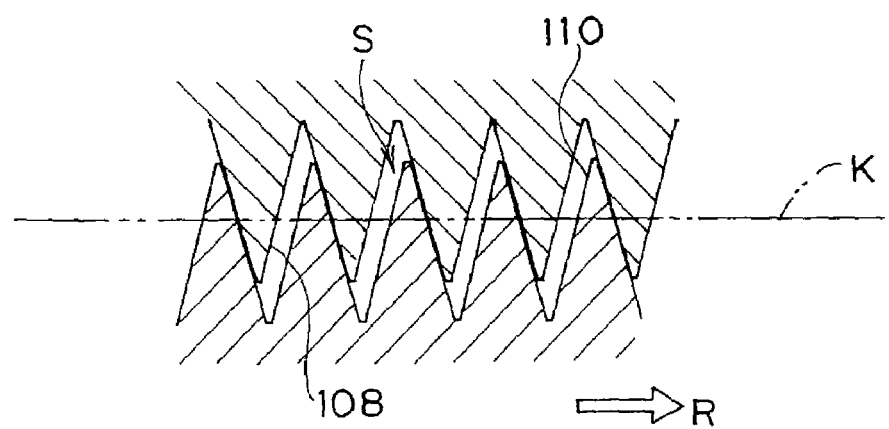
FIG. 4B is an explanatory diagram of a conventional meshing engagement between a reel gear and a drive gear.

As shown in FIGS. 2 and 3, a reel gear 40, by which the reel 30 is rotatably driven, is carved in an annular shape at a bottom surface of the reel hub 32. The reel gear 40 and the reel hub 32 are integrally formed from a resin material. The reel gear 40 has teeth 41 of predetermined pitch formed along a circle whose center coincides with an axis S of the reel 30. Each tip of the teeth 41 radially extends toward the axis S. Each of the teeth 41 has a substantially isosceles triangular cross section in which a tooth thickness decreases in a tapered manner from a bottom surface portion of the reel hub 32 towards a free end.

An attracted plate 42, which is formed in a disk shape from a metal blank, is buried or inserted in a bottom surface portion, inside the reel gear 40, of the reel hub 32. The attracted plate 42, which is made of metal material that can be attracted towards a magnet, has a circular insertion hole 43 formed at a center portion thereof. The attracted plate also has a plurality of openings 45, or three openings in this embodiment, formed outside the insertion hole 43. The openings 45 are disposed such that distances from the openings 45 to the reel axis S are substantially the same, and are circumferentially and evenly spaced apart one from another (120° apart). Each opening 45 is formed on an arc about the reel axis S, with opposed edges circumferentially extending whose curvatures correspond to respective distances from the reel axis S.

Three reference portions 48 are integrally formed on the bottom surface portion of the reel hub 32, and downwardly extend through respective openings 45 of the attracted plate 42. Each reference portion 48 has a cross section whose shape is substantially the same as the corresponding opening 45. The reference portions 48 have tip surfaces 49 serving as positioning surfaces each of which is formed by a flat surface that is orthogonal to the reel axis S. As shown in FIG. 3, the positioning surfaces 49 slightly protrude downward from the bottom surface of the attracted plate 42. The lengths of protruding from the attracted plate bottom surface, of the positioning surface 49, are substantially the same such that the positioning surfaces 49 are disposed on the same flat surface.

As shown in FIG. 3, an annular groove 44 is provided outside the reel gear 40. A rib 24, which is formed projecting upward at a peripheral portion of the circular aperture 22, is inserted into the annular groove 44. Thus, the reel gear 40 is outwardly exposed from the circular aperture 22. A drive device is provided with a rotating shaft 82 to rotate the reel 30. A drive gear 80, which corresponds to the reel gear 40, is provided on a top surface portion of the rotating shaft 82. At the reverse side of the drive gear 80, a ring-shaped magnet 86 is disposed and buried in the top surface portion of the rotating shaft 82. The magnet 86 has a flat top surface portion which is orthogonal to the reel axis S and which serves as a reference plane for positioning 87 to place the reel 30 in position along the axial direction. Further, a columnar protrusion 84 is provided at a center of the top surface portion of the rotating shaft 82.

As shown in FIG. 1, a reel gear 47 for braking is carved in an annular shape at a top surface of a bottom wall 38 inside the reel hub 32. A braking member 50, which is inserted into the reel hub 32, has a braking gear 52 carved at a periphery of an underside surface thereof, the braking gear 52 meshing with the reel gear 47. Specifically, a coil spring 51 downwardly urges the braking member 50 and thus the reel 30. When the magnetic tape cartridge is not in use (or when it is not inserted into the drive device), the reel gear 47 and the braking gear 52 mesh with one another such that the reel 30 is held so as not to rattle about or rotate improperly.

The coil spring 51 is held between an annular projection 26 that is provided at a center of an interior surface of the upper case 12 and an annular groove 54 that is provided on an upper surface of the braking member 50. A projection 56 of substantially cylindrical shape is provided at a center of a lower surface of the braking member 50 and is insertable into a through hole 38A of the reel hub 32. Further, protruding portions 58 each having substantially U-shape in plan view are diametrically disposed inside the annular groove 54, with opened sides of the protruding portions 58 being opposed to one another. Two hooked pins 28, which are provided in a protruding manner and disposed side by side inside the annular projection 26 of the upper case 12, are inserted into interior sides of the protruding portions 58, respectively.

An opening 60 is formed at a front-right corner portion of the magnetic tape cartridge 10 by partially cutting away the peripheral walls 16 and 18. The opening 60 is for drawing out, to an exterior of the magnetic tape cartridge 10 the magnetic tape T being wound on the reel 30. When the magnetic tape cartridge 10 is not in use, a leader block 70, which is secured to a distal end of the magnetic tape T, is held at the front-right corner portion, thereby closing off the opening 60.

More specifically, fitting walls 62 and interior walls 64 are provided at inner surfaces of the upper case 12 and the lower case 14 around the front-right corner portion (or the opening 60), the fitting walls and the interior walls corresponding to an outline of the leader block 70. A slit is provided in an upper surface of the upper case 12, extending along a front wall portion of the peripheral wall 16, so that a leaf spring-like hooked wall 66 is formed, which is elastically deformable in a front-back direction of the cartridge 10. By a leading edge of the leader block 70 being hooked at a prong (not illustrated) of an edge of the hooked wall 66, by an upper surface portion 70D and a lower surface portion 70E of the leader block 70 being respectively fitted to the fitting walls 62, and by a left end surface portion 70C of the leader block 70 abutting against the interior walls 64, the leader block 70 can be detachably retained with respect to the cartridge 10 due to such an elastically deformable means or hooked wall 66.

Recess portions 68, which have substantially the same curvature as a curved recess portion 72 formed at a leading end of the leader block 70, as viewed in plan view, are formed at locations of the upper case 12 and the lower case 14 in a vicinity of the opening 60, which correspond to a location of the curved recess portion 72 of the leader block 70. Thus, a drawing-out pin (not illustrated) of the drive device can easily be inserted therein to draw out the leader block 70.

As can be seen from the foregoing, the leader block 70 is formed in the shape of a substantially rectangular block. In addition to the left end surface portion 70C, the upper surface portion 70D and the lower surface portion 70E, the leader block 70 comprises a front surface portion 70A formed in a substantially circular arc shape in plan view, a rear surface portion 70B, and a right end surface portion 70I. The front surface portion 70A is formed with the curved recess portion 72 in which the drawing-out pin of the drive device may engage, as described above. The rear surface portion 70B has a curved surface which can constitute a part of a peripheral surface of a reel hub of a take-up reel (not illustrated) of the drive device when the leader block is connected to the reel hub of the take-up reel.

A through-hole portion 74 is formed on the upper surface portion 70D and the lower surface portion 70E. A recess portion 76 is formed at substantially a center of the left end surface portion 70C of the leader block 70. A fixing pin 78, which is made of a synthetic resin material and has elasticity, is inserted into the recess portion 76 with the magnetic tape T tucked therein such that the leader block 70 is secured to the distal end (free end) of the magnetic tape T.

As shown in FIG. 2, a memory board 90 is disposed within the magnetic tape cartridge 10 and in the vicinity of a front-left corner portion of the magnetic tape cartridge 10, through which the drive device can identify memory capacity, recording format and the like (hereinafter referred to as "the generation") of the magnetic tape cartridge 10, or in which the drive device can write individual information. The memory board 90 is secured to a support (not illustrated) which is formed in the vicinity of a corner portion within the magnetic cartridge 10 and inclined at the order of 30 to 45 degrees. Thus, a reader device 92 can gain access to the memory board 90 from a front face side to carry out reading of information, and a read/write device 94 can gain access to the memory board 90 from a bottom face side to carry out reading and writing of information.

The memory board 90 is provided in the magnetic tape cartridge 10 as described above. Thus, writing and reading of information on the memory board can be carried out in a non-contact manner through electromagnetic waves transmitted from and received in the read/write device 94. Further, the memory board 90 is disposed in the vicinity of a cartridge front face inside the magnetic tape cartridge 10. Thus, the memory board 90 can be accessed through electromagnetic waves by the read/write device 94, at the same time as or just before completion of loading of the magnetic tape cartridge 10 into the drive device. Therefore, as compared with a case in which the memory board 90 is disposed in the vicinity of a cartridge rear face within the magnetic tape cartridge, the read/write device 94 can access the memory board 90 at an earlier stage of loading of the magnetic tape cartridge.

Moreover, for example, when a library apparatus (not illustrated) uses a robot finger for loading the magnetic tape cartridge 10 into the library apparatus and the reader device 62 is disposed on the robot finger, access to the memory board 90 to carry out reading of information from the memory board 90 can be gained from the front face side of the magnetic tape cartridge.

Next, description will be given to operation of the magnetic tape cartridge described above. When the magnetic tape cartridge 10 is not in use and the reel 30 is housed in the magnetic tape cartridge 10, unintentional rotation of the reel 30 is prevented by the braking member 50. More specifically, the braking gear 52 of the braking member 50 being urged downward by the coil spring 51 is in meshing engagement with the reel gear 47 formed inside the reel hub 32 of the reel 30, thus preventing unintentional rotation of the reel 30. Then, the opening 60 is closed off by the leader block 70.

When the magnetic tape cartridge 10 is in use, it is inserted into an unillustrated bucket of the drive device. Once the magnetic tape cartridge 10 has been inserted into the bucket, the bucket is lowered such that the rotating shaft 82 relatively approaches the circular aperture 22. And then, the columnar protrusion 84 enters in the through hole 38A of the reel hub 32, abuts against the projection 56 of the braking member 50, and pushes up the braking member 50 through the projection 56, while opposing a biasing force exerted by the coil spring 51. As a result, the meshing engagement between the reel gear 47 and the braking gear 52 is released, and the reel gear 40 and the drive gear 80 are brought into meshing engagement with one another such that center lines thereof coincide with one another.

Then, the positioning surfaces 49 of the reference portions 48, which have projected beyond the bottom surface of the reel hub 32, abut against the reference plane for positioning 87 of the rotating shaft 82 such that the reel 30 is positioned at a reference position along the axial direction. Further, the magnet 86 secured on the rotating shaft 82 attracts the attracted plate 42 secured beneath the reel hub 32. As a result, the reel hub 32 and the rotating shaft 82 are maintained in a state in which the reference portion 48 of the reel hub 32 is pressed against the reference plane for positioning 87 of the rotating shaft 82. Therefore, displacement of the reel 30 due to vibrations from outside, inclination of the magnetic tape cartridge 10 or the like can be prevented. Thus, as compared with conventional structures, accurate positioning of the reel 30 along the axial direction with respect to the drive device can be realized and displacement of the reel 30 after having being positioned can certainly be prevented. Accordingly, "surge" does not occur at the bottom flange portion 34, a driving force for rotation from the drive gear 80 can be efficiently transmitted to the reel gear 40, and therefore, reliable drawing-out and rewinding of the recording tape can be carried out.

With the magnetic tape cartridge 10 in which the reference portion 48, which is adapted to abut against the reference plane for positioning 87 and to maintain the reel 30 in position, is disposed inside the reel gear 40, there is no need for widening the circular aperture 22 formed at the lower case 14, as compared with a case in which the reference portion 48 is disposed outside the reel gear 40. A deterioration of rigidity of the lower case 14 due to widening of the opening 22 can be prevented.

Now, the drawing-out pin of the drive device engages in the curved recess portion 72 of the leader block 70, by means of which the leader block 70 is drawn out from the magnetic tape cartridge 10. The leader block 70 is then mounted on the reel hub of the take-up reel of the drive device so that the magnetic tape T can be wound around the take-up reel. By synchronously rotating the reel 30 and the take-up reel in order for the magnetic tape T to be wound around the take-up reel, writing and reading of information on the magnetic tape can be carried out.

When the magnetic tape T has been completely wound around the take-up reel, the reel 30 and the take-up reel are then driven for rotation in reverse direction in order for the magnetic tape T to be rewound around the reel 30. After rewinding of the magnetic tape T around the reel 30, the leader block 70 is removed from the reel hub of the take-up reel, and then, hooked at the opening 60 of the magnetic tape cartridge 10 so as to close off the opening 60.

Next, the rotating shaft 82 is lowered such that the meshing engagement between the reel gear 40 and the drive gear 80 is released and then, the columnar protrusion 84 is drawn off from the through 38A. Thereby, braking member 50 is urged downward by a biasing force of the coil spring 51 such that the braking gear 52 and the reel gear 47 are brought into meshing engagement with each other so that unintentional rotation of the reel 30 is prevented, as described above. Thereafter, the magnetic tape cartridge 10 is ejected from the drive device.

As is explained above, in accordance with the present invention, reliable drawing-out and rewinding of the recording tape can be carried out and proper positioning of the reel along a height thereof can be carried out.

What is claimed is:

1. A combination of a tape cartridge and a tape drive, the tape cartridge having a reel incorporated therein, and being insertable at the tape drive, said tape drive carrying out at least one of reading and writing of data and has a rotating member that is integrally connectable to the reel when the tape cartridge is inserted, the rotating member including a drive gear for transmitting a drive force to the reel, a central protrusion, and a positioning portion for relatively positioning the reel and extending inwardly to contact the central protrusion, said tape cartridge comprising:
   a reel gear, which is substantially ring-shaped and is meshable with the drive gear for transmitting the drive force;
   a reel reference portion, which is disposed inside the reel gear and is operative to abut against the positioning portion for the relative positioning; and
   a plate attached to the reel reference portion, the plate having at least one opening,
   wherein the reel reference portion includes at least one protrusion extending through the at least one opening, and
   wherein the positioning portion comprises a magnet, and the plate is attracted to the magnet.

2. The tape cartridge according to claim 1, further comprising a case to accommodate and rotatably support the reel.

3. The tape cartridge according to claim 2, wherein the case is formed with an aperture of a substantially circular shape, from which aperture the ring-shaped reel gear is exposed to the outside of the case.

4. The tape cartridge according to claim 3, wherein the integral connection between the rotating member and the reel is carried out through the aperture.

5. The tape cartridge according to claim 3, wherein the aperture has an internal diameter that is slightly larger than an external diameter of the reel gear.

6. The tape cartridge according to claim 2, further comprising a braking member for releasably preventing rotation of the reel.

7. The tape cartridge according to claim 6, wherein when the integral connection between the rotating member and the reel is carried out, the braking member releases the reel so as to allow it to rotate.

8. The tape cartridge according to claim 2, wherein the case comprises an upper case and a lower case.

9. The tape cartridge according to claim 2, wherein the case is substantially rectangular in plan view.

10. The tape cartridge according to claim 1, wherein an attracting force exerted by the magnet facilitates the integral connection between the rotating member and the reel.

11. The tape cartridge according to claim 1, wherein the plate includes a plurality of openings, and
   wherein the reel reference portion includes at least three reference surfaces, which are on the same surface and are respectively extended through the openings.

12. The tape cartridge according to claim 1, wherein the reel gear is provided on a bottom surface of the reel.

13. The tape cartridge according to claim 1, wherein the drive gear is substantially ring-shaped.

14. The tape cartridge according to claim 1, wherein the reel comprises a reel hub around which a recording tape is wound.

15. The tape cartridge according to claim 1, wherein the reel comprises an upper flange portion and a lower flange portion.

16. The tape cartridge according to claim 1, wherein the reel gear has teeth, and the plate is positioned past the teeth in a direction towards the positioning portion.

17. The tape cartridge according to claim 1, wherein the reel gear has teeth, and the reel reference portion is positioned past the teeth in a direction towards the positioning portion.

18. The tape cartridge according to claim 1, wherein the plate includes a metal material.

19. A tape drive into which a tape cartridge with a reel incorporated therein is insertable and which carries out at least one of reading and writing of data, said tape cartridge comprising a reel gear, which is substantially ring-shaped and is meshable with a drive gear for transmitting the drive force, and a reel reference portion, which is disposed inside the reel gear and is abutable against a positioning portion for the relative positioning, the tape drive comprising:
   a rotating member that is integrally connectable to the reel when the tape cartridge is inserted, the rotating member comprising a central protrusion;
   a drive gear that is provided on the rotating member, for transmitting a drive force to the reel; and
   a positioning portion that is provided in the rotating member, for relatively positioning the reel of the tape cartridge, the positioning portion extending inwardly to contact the central protrusion,
   wherein the reel reference portion includes at least one protrusion which extends from the reel gear and abuts against the positioning portion,
   the at least one protrusion extends through a plate attached to the reel gear, and
   wherein the positioning portion comprises a magnet, and the plate is attracted to the magnet.

20. The tape drive according to claim 19, wherein when the integral connection between the rotating member and the reel is carried out, the rotating member enables rotation of the reel.

21. The tape drive according to claim 19, wherein an attracting force exerted by the magnet facilitates the integral connection between the rotating member and the reel.

22. The tape drive according to claim 19, wherein the reel gear has teeth, and the plate is positioned past the teeth in a direction towards the positioning portion.

23. The tape drive according to claim 19, wherein the reel gear has teeth, and the reel reference portion is positioned past the teeth in a direction towards the positioning portion.

24. The tape drive according to claim 19, wherein the plate includes a metal material.

* * * * *